United States Patent [19]

Scott

[11] 3,774,111

[45] Nov. 20, 1973

[54] PEAK HORSEPOWER METER

[75] Inventor: William Michael Scott, Montreal, Quebec, Canada

[73] Assignee: Canadian National Railway Company, Montreal, Quebec, Canada

[22] Filed: Mar. 20, 1972

[21] Appl. No.: 235,911

[52] U.S. Cl. .............. 324/140 R, 73/134, 73/136 R
[51] Int. Cl. .......................... G01r 7/00, G01l 3/00
[58] Field of Search ........................... 324/140, 142; 73/133, 134, 136; 318/490; 322/99; 105/49, 61

[56] References Cited
UNITED STATES PATENTS
3,638,480   2/1972   Calud.............................. 73/136 R

OTHER PUBLICATIONS

Ryerson, Instr. & Control Systems, pp. 95–97; Jan. 1963.

Primary Examiner—Alfred E. Smith
Attorney—Fetherstonhaugh & Co.

[57] ABSTRACT

A peak horsepower meter for locomotives is provided which enables spot checking of locomotive horsepower during operation. The overall system preferably includes base plates installed on each locomotive which provide first and second signals related to traction motor current and voltage, respectively. A single portable unit which plugs into a socket in each base plate is used to monitor the horsepower for each locomotive. The overall meter circuitry includes a current shunt for producing the first signal and a voltage divider for producing the second signal and an electronic switch for electrically multiplying the two signals together to produce an analog signal related to instantaneous locomotive horsepower, isolation transformers serving to electrically isolate the electronic switch. The analog signal is converted to a peak indication by a circuit including a voltage comparator which compares the analog signal with a signal corresponding to the previous peak and which controls stepping of a stepping motor which drives a digital display device.

15 Claims, 3 Drawing Figures

PEAK HORSEPOWER METER

FIELD OF THE INVENTION

The present invention relates to a peak horsepower meter particularly for use with a diesel electric locomotive.

BACKGROUND OF THE INVENTION

In operating a diesel electric locomotive, it is, of course, desirable to know whether the locomotive is in proper running condition such that the locomotive is capable of delivering, upon demand, the maximum horsepower output thereof. Most heavy trains are presently pulled by multiple locomotives in tandem and this makes it difficult to determine which out of a number of units is not pulling its corresponding share of the load. Further, to obtain the horsepower output of a particular diesel locomotive it is presently necessary to remove that locomotive from service and put the locomotive through what is known as a "load box" test in a railway shop. The load box simulates the traction motor loads and by measuring the current delivered and the voltage produced, an indication of the electrical horsepower of the locomotive can be obtained under various locomotive operating conditions. It should be pointed out that, because of the necessity of removing the locomotive from service, the test is performed only at very infrequent intervals and as a result a locomotive may be performing poorly for an extended period of time before this fact is discovered.

SUMMARY OF THE INVENTION

In accordance with the invention, a horsepower meter is provided which is particularly adapted for use on locomotives. The meter of the invention preferably provides an indication, in digital form, of the peak horsepower output (per traction motor), of a locomotive during actual operation. In addition, a further output is provided which produces a voltage proportional to instantaneous locomotive horsepower.

The meter system of the invention preferably includes a plug-in type meter unit and an inexpensive base plate installed on each locomotive the horsepower of which is to be determined. The base plate includes an output socket at which are provided electrical signals corresponding to the parameters, i.e., traction motor current and voltage, used in determining peak horsepower, and thus through the use of a single meter unit, a large number of locomotives can be monitored on a "spot check" basis. Hence, the meter system of the present invention enables a determination to be made as to whether a locomotive is developing full horsepower between the infrequent "load box" tests discussed above.

According to a presently preferred embodiment, the horsepower meter of the inventor comprises a first means, preferably in the form of a current shunt, for producing a first electrical signal related to the current through a traction motor of the locomotive and a second means, preferably in the form of a voltage divider network, for producing a second signal related to the voltage across that traction motor. The first signal is converted into a further signal having a frequency corresponding to the traction motor current, which signal is multiplied electrically by the second signal to produce a voltage signal related to instantaneous locomotive horsepower. The current shunt and voltage divider means are electrically isolated from the transistor switch used in the electrical multiplication operation preferably by means of isolation transformers connected in the two branches. The output of the voltage divider network is chopped and amplified before passing through the isolation transformer and rectified after passing therethrough.

The analog signal produced by the transistor switch and associated amplifier and filter is converted into a peak horsepower indication by a circuit including a voltage comparator which compares the analog signal with a signal corresponding to the previous peak indication, a digital indicator or display device driven by a stepping motor and pulse generator means including an electronic switch responsive to the output of the voltage comparator for controlling stepping of the stepping motor in accordance with that output.

Other features and advantages of the invention will be set forth in or apparent from the detailed description of a preferred embodiment set forth hereinbelow.

BRIEF DESCRIPTION OF THE DRAWINGS

FIG. 3 is a schematic block circuit diagram of the peak follower portion of the electrical system of the invention.

DESCRIPTION OF THE PREFERRED EMBODIMENT

Figure 1:
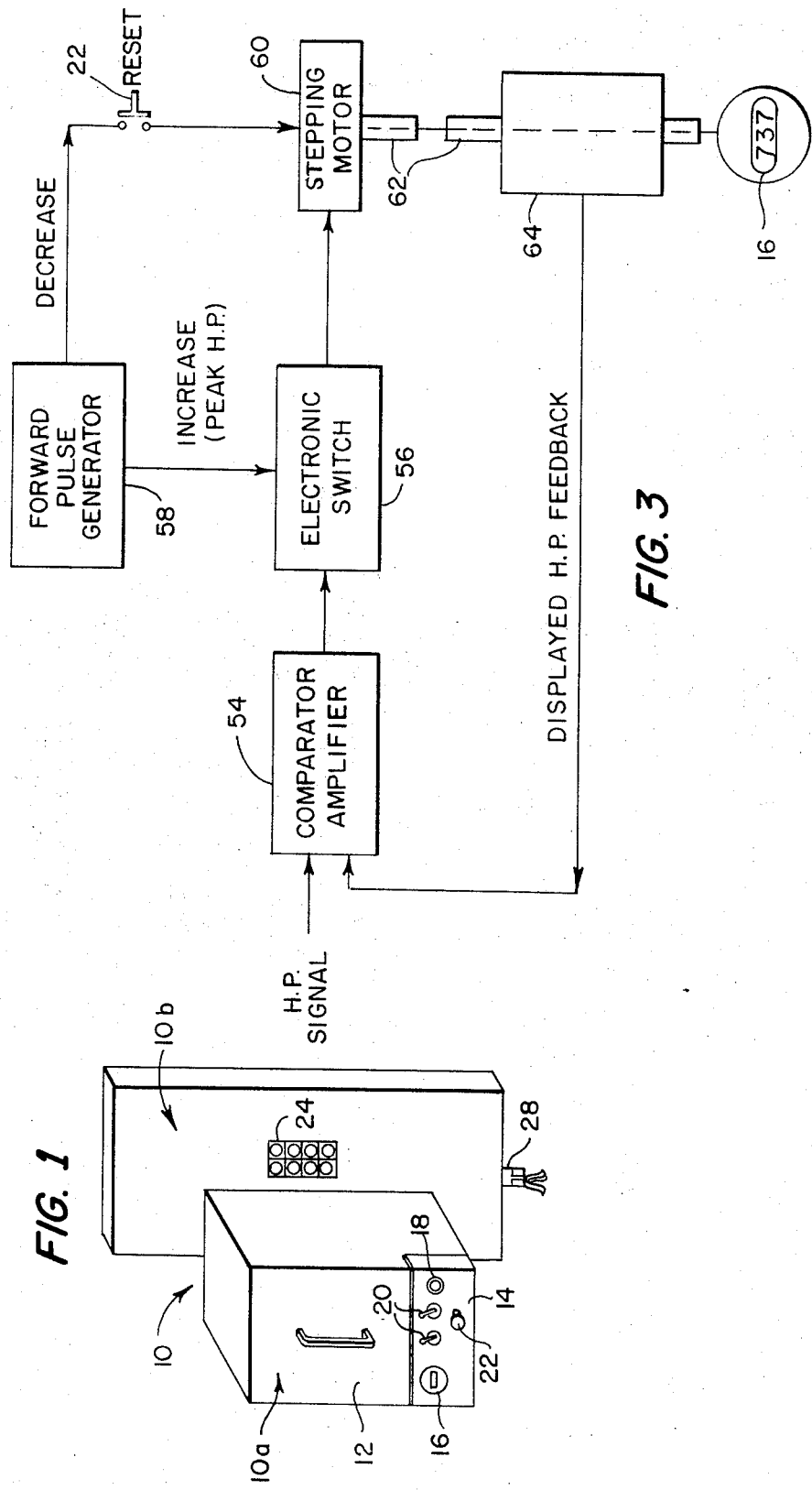
FIG. 1 is a perspective view of a horsepower meter in accordance with a presently preferred embodiment of the invention showing the portable meter unit detached from and spaced from the stationary transducer unit.
Figure 2:
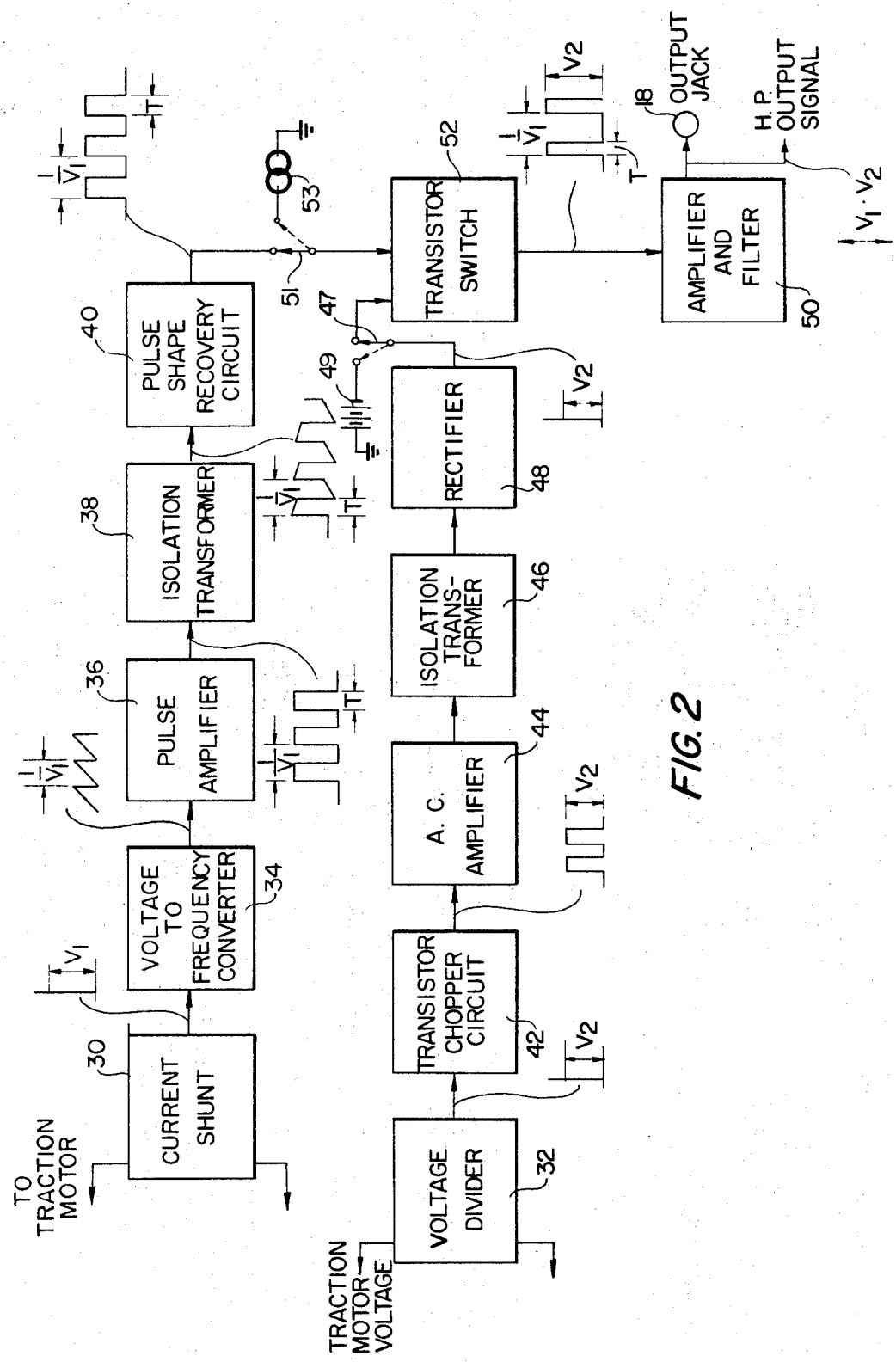
FIG. 2 is a schematic block circuit diagram of the current and voltage transducer and pulse multiplier portion of the electrical system of the horsepower meter of the invention.

Referring to FIG. 1, the peak horsepower meter system of the invention, which is indicated generally at 10, basically comprises a meter unit 10a and a base plate 10b. The meter unit 10a, which is of portable, plug-in design, includes a casing or housing unit 12 which houses a majority of the electrical circuitry described hereinbelow in connection with FIGS. 2 and 3. The meter unit 10a is shown in FIG. 1 with the control panel cover removed so as to show the control panel 14. The control panel 14 includes a digital indicator 16 which produces a digital indication of the peak horsepower as well as an output jack or socket 18 which, in operation, provides an output voltage proportional to instantaneous locomotive horsepower as described hereinafter. In addition, a pair of control switches 20 and a reset button 22 (also described below) are also included on control panel 14.

Meter unit 10a includes a plug (not shown) located on the back thereof which is adapted to be plugged into a socket 24 in base plate 10b. Base plate 10b is of inexpensive design and is adapted to be fixedly mounted or installed in a locomotive to be tested. By installing corresponding base plates in a series of locomotives, each such locomotive can be tested using a single meter corresponding to unit 10a. Six input wires or conductors are required for the overall test unit, four from the locomotive traction circuit as discussed hereinbelow and two from the power supply, which, in this instance, is provided by two 74 volt D.C. wires. The base plate assembly 10b includes connections to the traction motor circuit, connected to an input terminal indicated at 28, so that by plugging in unit 10a, voltage signals corresponding to the required tractor motor currents and voltages are available at the outlets of socket 24. The power supply for unit 12 is also provided at the outlets of socket 24. The power supply is derived from the locomotive circuits and is preferably of the type described in U.S. application Ser. No. 753,138, filed on Aug. 16, 1968. With the use of three separate floating reference potentials it is then possible to connect the ground or common of the supply potentials for the horsepower computation circuitry described below directly to the frame of the locomotive to minimize any danger to personnel. This is made possible through the provision of two isolating transformers as discussed hereinafter.

To produce an electrical signal related to the horsepower output of a diesel electric locomotive, it is necessary to measure the current through a traction motor and the voltage across that motor and convert the values thus obtained the frequency signals which can be processed electronically. To this end, referring to FIG. 2, a current shunt 30 and voltage divider 32 are provided. It is noted that the main generator or alternator current could be used but a current shunt providing a measure isolation of this current is not available on most locomotives. Typically, current shunt 30, which is connected in series with a traction motor, produces an output of either 50 or 100 millivolts for 1,000 amperes of traction motor current. Control switches 20 of meter 10 include a range switch for adapting the meter to the shunt used. It will, of course, be appreciated that a shunt of any adequate current rating can be used and that the values given are merely exemplary. Voltage divider 32 is, as indicated, connected across the traction motor and produces a voltage proportional to the traction motor voltage. As described hereinafter the current and voltage signals are first processed independently and then combined for further processing.

As stated, current shunt 30 produces an output voltage signal proportional to the traction motor current, which signal is applied to a voltage to frequency converter 34. Converter 34 is of conventional construction and produces an output signal thefrequency of which is proportional to the traction motor current. The waveform of the output voltage to frequency converter 34 is generally that of a repetitive ramp voltage, as is indicated, and this voltage is processed in a pulse amplifier 36 to produce constant duration pulses of convenient duration T indicated at the output of amplifier 36. Because the possibility exists of having a 1,500 volt potential difference between the current and voltage sensors, the pulses from amplifier 36 are passed through an iyolation transformer 38. Isolation transformer 38 distorts the waveform of the pulse input thereto, as indicated, and a pulse shape recovery circuit or pulse shape 40 is provided to restore the pulse train to the original shape thereof. Thus, the circuitry thus far described produces a pulse train having a frequency proportional to the traction motor current and electrically isolated from the current shunt 30. In this latter regard, it is noted in a locomotive, the alternator or main generator output is "floating" with regard to the frame or chassis. In addition, the current and voltage inputs may have to be taken at opposite ends of this output. Since, as described above, the peak horsepower meter of the invention is mounted to the locomotive chassis it is imperative that all the signal inputs are isolated from each other, and from the frame, to avoid injury to personnel.

The output of voltage divider 32 is also electrically isolated from the remainder of the circuit. This output is first converted into an A.C., or pulsating D.C. voltage by means of a D.C. chopper circuit 42. Chopper 42 similarly to the other circuits hereindescribed is of conventional construction and includes a transistor which is driven into and out of conduction at a predetermined rate. It should be noted that the chopper frequency is not important and that only the amplitude of the chopped D.C. voltage V2 is relevant. An A.C. amplifier 44 connected to the output of chopper 42 provides a low impedance drive for a second isolation transformer 46. A rectifier 48 connected to the output of transformer 46 produces a voltage V2 which is equal in magnitude to the voltage produced by voltage divider circuit 32 but which is electrically isolated from that circuit. It is noted that the value of the output of the rectifier 48 would actually be V2/2 but for the sake of simplicity it is assumed that the signal is suitably amplified somewhere between chopper 42 and the output of rectifier 48 such that the rectifier output is a voltage V2 as stated.

The output of rectifier 48 is connected to an operational amplifier and filter 50 through a transistor switch 52. The periods of conduction and nonconduction of switch 52 are controlled by the pulses from pulse shape recovery circuit 40. Thus, the output of transistor switch 32 is a train of pulses whose amplitude is proportional to the traction motor voltage V2 and whose frequency is proportional to the traction motor current. The D.C. gain of operational amplifier 50 is adjustable for use with both 50 and 100 millivolt shunts. Further, capacitors of various values may be switched into the feedback path of the operational amplifier 50 to vary the response time between about 1 second to ½ minute depending on whether the meter is used to monitor sustained peak horsepower or instantaneous horsepower. The term "sustained" horsepower is perhaps more appropriate than "instantaneous" horsepower, where, as set forth, the system is operating in a mode providing a response time of approximately one-half minute. It is noted that for measuring sustained peak horsepower the response should be relatively slow so as to avoid readings based on momentary horspower peaks such as occur during transition and wheel slip on some locomotives. The filter in amplifier and filter circuit 50 performs an averaging function and produces a D.C. voltage whose magnitude is directly proportional to the product of traction motor voltage and tractor motor current, a product which is, of course, proportional to locomotive horsepower.

As shown in FIG. 1 the output of amplifier and filter circuit 50 is connected to output socket or jack 18 referred to hereinabove, which output, being proportional to instantaneous or sustained locomotive peak horsepower, can be used to drive a chart recorder or the like. It should be noted that either the current or voltage inputs can be disconnected and held at some constant value so that the output at jack 18 becomes an indication of instantaneous current or voltage. To this end, a first two-pole switch 47 is provided which operates, in the second position thereof shown in dashed lines in FIG. 2, to disconnect the voltage input to transistor switch 52 from the motor voltage sensing circuit and to connect this input to a constant voltage source indicated at 49. In the mode, the output at jack 18 is a measure of instantaneous current. Similarly, a second switch 51, in the dashed line position thereof, disconnects the input from the current sensing circuit and connects the input to the transistor switch 52 to a constant current source indicated at 53, jack 18 thus providing an output which is a measure of the instantaneous voltage. However, as discussed above, the principle use contemplated for the system of the invention is to provide a peak horsepower indication.

Referring to FIG. 3, the peak follower portion of the electrical system is shown. An operational amplifier 54 is connected as a voltage comparator with one input connected to receive the sustained horsepower output signal of circuit 50 as indicated. The second input receives a feedback signal proportional to the previous sustained peak horsepower displayed. The output of comparator amplifier 54 is connected to an electronic switch 56 which controls the transmission of pulse from pulse generator 58 to a stepping motor 60. Stepping motor 60 drives a shaft 62 for peak horsepower display device or indicator 16, a 10-turn potentiometer 64 being mounted on shaft 62 to provide the feedback signal discussed above. Pulse generator 58 continuously attempts to pulse stepping motor 60 in the forward direction but the signals therefrom pass to motor 60 only when electronic switch 56 is conducting which is in turn determined by comparator amplifier 54. If the instantaneous analog horsepower signal is greater than the previous maximum horsepower being displayed by indicator 16, the comparator amplifier actuates the electronic switch 56 so that pulses from pulse generator 58 cause stepping of motor 60 until the feedback signal from potentiometer 64 is equal to or slightly greater than the analog horsepower signal from circuit 50. At this point, the drive to stepping motor 60 is deactuated, switch 56 being non-conducting, and a new peak horsepower indication is displayed by indicator 16. Should it be desired to reset the display to zero, the reset pushbutton 22 referred to above, and connected between pulse generator 58 and motor 60, is depressed until stepping motor 62 is driven in the reverse direction a sufficient amount so that indicator 16 reads zero.

The switches 20 mentioned above are used to scale the device for, in an exemplary embodiment, 50 millivolt or 100 millivolt, 1,000 ampere current shunt operation and to slow the response of the meter to prevent indications of momentary peaks such as occur during transition or wheel slip on some locomotives.

Considering the operational characteristics of the meter system, a test system in accordance with the invention consumed about 60 watts from the 74 volt lines. During extreme temperature tests, the device has been shown to be capable of an accuracy of ± 15 horsepower in ambient temperatures ranging between −25° to +140°F, for horsepower outpus per axle of from 250 to 1,000 horsepower. Readings obtained during actual road tests have indicated that the results produced are within 1 percent of those obtained by calculation from load box meters.

Although the invention has been described with respect to an exemplary embodiment thereof, it will be understood by those skilled in the art that variations and modifications in this embodiment may be effected without departing from the scope and spirit of the invention.

I claim:

1. A peak horsepower meter for locomotives comprising means responsive the current flow through a traction motor of said locomotive for producing a first electrical output signal in accordance with this current flow, means responsive to the voltage across said traction motor for producing a second electrical signal in accordance with this voltage, means for multiplying said first and second signals together to produce a further electrical signal in accordance with the horsepower output of said traction motor, means for isolating the multiplying means from said traction motor current responsive means and said traction motor voltage responsive means and peak horsepower indicating means for converting the output of said multiplying means into an indication of peak horsepower and means for displaying said indication, said converting means including comparator means for comparing said further electrical signal produced by said multiplying means with a signal corresponding to the previous peak horsepower indication.

2. A horsepower meter as claimed in claim 1 wherein said current responsive means comprises current shunt means for producing an output voltage in accordance with the current flow through the traction motor, said meter further comprising voltage to frequency converter means connected to the output of said current shunt means for converting said voltage signal into a further signal having a frequency proportional to said voltage.

3. A horsepower meter as claimed in claim 2 wherein said isolating means comprises an isolation transformer connected between said voltage to frequency converter means and said multiplying means.

4. A horsepower meter as claimed in claim 2 further comprising pulse amplifier means connected to the output of said voltage to frequency converter means for shaping that output and pulse shape recovery means connected to the output of said isolation transformer for shaping the output signal therefrom.

5. A horsepower meter as claimed in claim 3 further comprising chopper means connected to the output of said traction motor voltage responsive means for converting said second electrical signal into a time varying periodic signal, said isolationg means further comprising a second isolation transformer connected between said chopper means and said multiplying means, said meter further comprising rectifier means connected to the output of said second isolation transformer.

6. A meter as claimed in claim 5 wherein said chopper means comprises a transistor chopper, said meter including an A.C. amplifier connected to the output of said chopper.

7. A meter as claimed in claim 5 wherein said multiplying means comprises a transistor switch including a first input connected to the output of said rectifier and a gating input connected to receive a signal having a frequency corresponding to the frequency of the output of said converter means such that the periods of conduction of said transistor switch correspond to said frequency.

8. A meter as claimed in claim 7 wherein said multiplying means further comprises amplifier and filter means connected to the output of said transistor switch.

9. A meter as claimed in claim 1 wherein said peak horsepower indicating means further comprises a stepping motor for driving said display means, a pulse generator for controlling stepping of said stepping motor and an electronic switch responsive to said comparator means and connected between said pulse generator and said stepping motor, for controlling the passage of pulses from said pulse generator to said stepping motor.

10. A meter as claimed in claim 9 wherein said display means includes a potentiometer driven by said stepping motor for producing said signal corresponding to the previous peak horsepower indication.

11. A peak horsepower measuring system for an electric locomotive comprising stationary means, individual to each locomotive the horsepower of which is to be measured, for producing a first signal related to the current through a traction motor of the corresponding locomotive and a second signal related to the voltage across said traction motor and a portable meter unit including means for detachably connecting said unit to said stationary means, said portable unit comprising means for multiplying together signals related to said first and second signals to produce a resultant signal related to the instantaneous horsepower of the corresponding locomotive, means for electrically isolating said multiplying means from said stationary means, and peak horsepower indicating means for converting said resultant signal into an indication of peak horsepower, said peak horsepower indicating means comprising comparator means for comparing the resultant signal produced by said multiplying means with a signal corresponding to the previous peak horsepower indication and display means for displaying the peak horsepower indication in accordance with the output of said comparator means.

12. A peak horsepower measuring system as claimed in claim 11 wherein said means for converting said resultant signal into an indication of peak horsepower further comprises stepping motor means for driving said display means and pulse generator means responsive to the output of said comparator means for controlling stepping of said stepping motor.

13. A peak horsepower measuring system as claimed in claim 11, wherein said means for producing said first and second signals includes a current shunt for producing said first signal and voltage divider means for producing said second signal, said portable unit including voltage to frequency converter means connected, in operation, to the output of said current shunt for converting the voltage output of said current shunt into a signal having frequency related to the current through the said traction motor.

14. A system as claimed in claim 11 further comprising means for disconnecting the said first signal from the input to said multiplying means and holding the current input to said multiplying means constant so as to produce an output related to the instantaneous voltage across the traction motor.

15. A system as claimed in claim 11 further comprising means for disconnecting the said second signal from the input to said multiplying means and holding the voltage input to said multiplying means constant so as to produce an output related to the instantaneous current through the traction motor.

* * * * *